United States Patent
Cardone et al.

(10) Patent No.: US 9,779,377 B2
(45) Date of Patent: Oct. 3, 2017

(54) CUSTOMIZATION OF EVENT MANAGEMENT AND INCIDENT MANAGEMENT POLICIES

(71) Applicant: INTERNATIONAL BUSINESS MACHINES CORPORATION, Armonk, NY (US)

(72) Inventors: Josephine Cardone, Pleasantville, NY (US); Steven S. Pantridge, Quebec (CA); Ramani R. Routray, San Jose, CA (US); Yang Song, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 1051 days.

(21) Appl. No.: 14/030,223

(22) Filed: Sep. 18, 2013

(65) Prior Publication Data

US 2015/0081376 A1    Mar. 19, 2015

(51) Int. Cl.
*G06Q 10/06*    (2012.01)

(52) U.S. Cl.
CPC ................. *G06Q 10/0633* (2013.01)

(58) Field of Classification Search
None
See application file for complete search history.

(56) References Cited

U.S. PATENT DOCUMENTS

| | | | |
|---|---|---|---|
| 6,324,647 B1 | 11/2001 | Bowman-amuah | |
| 6,957,257 B1 * | 10/2005 | Buffalo | G06F 11/0748 709/200 |
| 7,418,733 B2 * | 8/2008 | Connary | H04L 43/045 709/224 |
| 8,166,143 B2 | 4/2012 | Guan et al. | |
| 8,756,178 B1 * | 6/2014 | Bruckhaus | G06N 7/02 706/13 |
| 8,794,513 B2 * | 8/2014 | Wayne | G06Q 10/06 235/379 |
| 9,262,731 B1 * | 2/2016 | Koushik | G06Q 10/10 |
| 2008/0027768 A1 * | 1/2008 | Thurlow | G06Q 10/025 705/6 |
| 2009/0058857 A1 * | 3/2009 | Ballantyne | G06T 11/206 345/440 |
| 2010/0161539 A1 * | 6/2010 | Kandanala | H04L 41/5074 706/47 |
| 2011/0077993 A1 * | 3/2011 | Sailer | G06F 17/3053 705/7.19 |
| 2011/0288692 A1 | 11/2011 | Scott | |
| 2011/0295898 A1 | 12/2011 | Grabarnik et al. | |
| 2012/0041858 A1 * | 2/2012 | Lewis | G06Q 10/04 705/34 |

(Continued)

OTHER PUBLICATIONS

Pegasystems Inc., "Energy Industry Incident Management for Energy: Reducing Risk, Response Time and Cost", 2012; 12 Pages.

*Primary Examiner* — Thomas L Mansfield, Jr
(74) *Attorney, Agent, or Firm* — Anthony Canale; Andrew M. Calderon; Roberts Mlotkowski Safran Cole & Calderon P.C.

(57) ABSTRACT

A method includes analyzing, by a computer device, data associated with tickets generated in a managed environment. The method also includes generating, by the computer device, a suggested rule change based on the analyzing. The method further includes receiving, by the computer device, an acceptance or denial of the suggested rule change.

19 Claims, 5 Drawing Sheets

(56) References Cited

U.S. PATENT DOCUMENTS

| | | |
|---|---|---|
| 2012/0155323 A1 | 6/2012 | Ramachandran et al. |
| 2012/0166231 A1* | 6/2012 | Denker .................. G06Q 10/02 705/5 |
| 2012/0224057 A1 | 9/2012 | Gill et al. |
| 2012/0328283 A1 | 12/2012 | Mayo et al. |

* cited by examiner

CUSTOMIZATION OF EVENT MANAGEMENT AND INCIDENT MANAGEMENT POLICIES

FIELD OF THE INVENTION

The present invention generally relates to managing information technology (IT) environments and, more particularly, to event management and ticketing in IT environments.

BACKGROUND

Large scale enterprise IT environments, such as enterprise data centers, typically have multiple management systems such as: application management, database management, server management, storage management, network management, backup/recovery management, event management, incident management, etc. Event management systems are configured to listen and report on events by subscribing to the management systems for correlation and event/alert management based on rules and/or policies. Auto-ticketing is such systems to create tickets automatically from events that occur in the IT environment. For example, event management and ticketing systems (EMTS) may be utilized in enterprise IT environments to generate tickets to the system administrator when certain anomalies are detected (via alerts) and require further investigation. Auto-ticketing allows the EMTS to generate tickets automatically following a set of predefined rules, i.e., auto-ticketing rules. However, improper calibration of event subscription policies, filtering rules, and auto-ticketing rules generates redundant information.

A conventional EMTS obtains information from multiple management systems (also called management sources or silos), such as application management, database management, server management, storage management, network management, backup/recovery management, and incident management, among others. A single system anomaly may trigger multiple alerts from separate management sources, which produces redundant information with unnecessary auto-tickets and hence increases the overhead of the EMTS as well as the system administrator, since each auto-ticket needs to be investigated and inspected before being labeled as redundant and inactive. Moreover, the auto-ticketing rules in conventional EMTS solutions are usually configured in an empirical and universal way which is less agile to each individual account's own IT infrastructure conditions.

SUMMARY

In a first aspect of the invention, there is a method that includes analyzing, by a computer device, data associated with tickets generated in a managed environment. The method also includes generating, by the computer device, a suggested rule change based on the analyzing. The method further includes receiving, by the computer device, an acceptance or denial of the suggested rule change.

In another of the invention, there is a computer program product for managing events. The computer program product includes a computer usable storage medium having program code embodied in the storage medium. The program code is readable/executable by a computing device to: obtain data associated with a first set of tickets generated by an event management and ticketing system in a managed environment, wherein the first set of tickets are generated according to a rule set over a first time period; determine and present a ranked list of suggested rule changes based on analyzing the data; and create a new rule set by modifying the rule set to incorporate at least one of the suggested rule changes. The program code is readable/executable by a computing device to: obtain new data associated with a second set of tickets generated by the event management and ticketing system in the managed environment, wherein the second set of tickets are generated according to the new rule set over a second time period; determine and present a new ranked list of suggested rule changes based on analyzing the new data; determine and present a success score; and determine and present a deviation score with respect to at least one of: a global rule set, and another user account.

In a further aspect of the invention, there is a computer system for managing events. The system includes a CPU, a computer readable memory and a computer readable storage medium. Additionally, the system includes one or more program instructions. The program instructions are operable to obtain data associated with tickets generated by an event management and ticketing system in a managed environment, wherein the first set of tickets are generated according to a rule set. The program instructions are operable to determine and present a ranked list of suggested rule changes based on analyzing the data, wherein the ranked list of suggested rule changes includes at least one of: adding an event to an auto-ticketing rule, removing an event from an auto-ticketing rule, and disabling auto-ticketing for a first event based on an existence of a ticket for a second event. The program instructions are operable to create a new rule set by modifying the rule set to incorporate at least one of the suggested rule changes based on receiving acceptance of the at least one of the suggested rule changes from a user. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
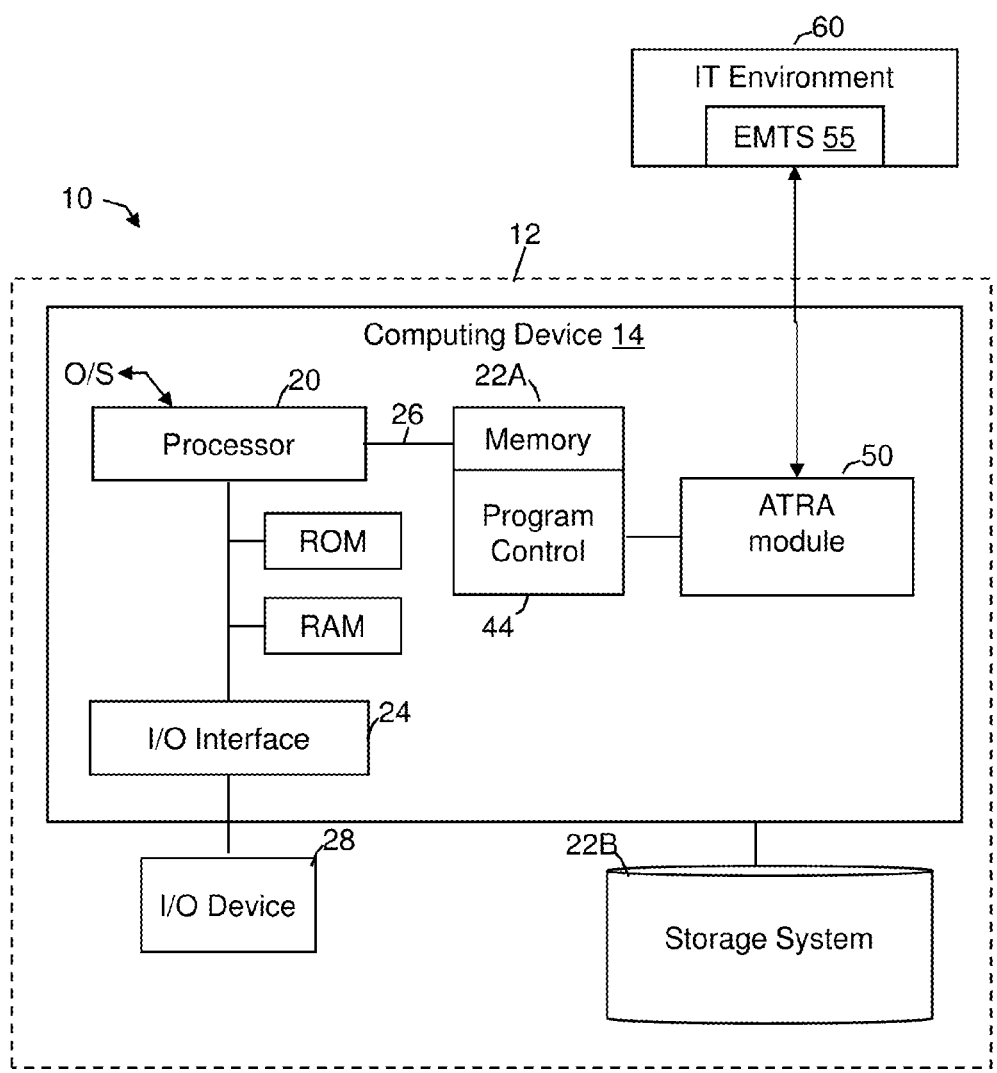
FIG. 1 shows an illustrative environment for implementing the steps in accordance with aspects of the invention.

The present invention generally relates to managing information technology (IT) environments and, more particularly, to event management and ticketing in IT environments. In accordance with aspects of the invention, there are systems and methods to calibrate the auto-ticketing rules of an EMTS for an individual account by making automatic, flexible, and adaptive auto-ticketing rule recommendations. In embodiments, an auto-ticketing rule advisor (ATRA) module makes auto-ticketing rule recommendations based on an analysis of past ticket records. The recommendations may be used to customize a global filtering rule to produce an account-specific customized filtering rule (CFR) for a particular IT environment. In this manner, implementations of the invention improve the accuracy and efficiency of the EMTS and reduce the burden of the system administrator.

According to aspects of the invention, the ATRA module provides a calibration framework that receives inputs such as, for example, auto-ticketing/alerting master rules (i.e., a universal rule set applicable to all accounts), current auto-ticketing/alerting rules (applicable to individual account), ticket/event data (e.g., manual tickets), and environment data (e.g., new nodes added with routing changes). In embodiments, the ATRA module generates rule set update recommendations based on applying predefined decision criteria to the inputs. The ATRA module may generate the rule recommendations periodically, e.g., once every pre-defined time period (e.g., once a week). Historical information utilized by the ATRA module can be a full history of records or a subset of all records sampled by certain algorithms, in order to reduce the computational overhead.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls auto-ticketing rule advisor (ATRA) ATRA module 50, e.g., that performs one or more of the processes described herein. ATRA module 50 can be implemented as one or more program code in program control 44 stored in memory 22A as separate or combined modules. Additionally, ATRA module 50 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

According to aspects of the invention, ATRA module 50 communicates with an event management and ticketing systems (EMTS) 55 associated with an IT environment 60. In embodiments, ATRA module 50 analyzes tickets created in EMTS 55 and, based on the analysis, generates recommendations for customizing the rules by which EMTS 55 creates tickets. In further embodiments, ATRA module 50 generates performance metrics associated with customized rules that are adopted in EMTS 55, including, but not limited to, historical update success score(s) and deviation score(s).

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
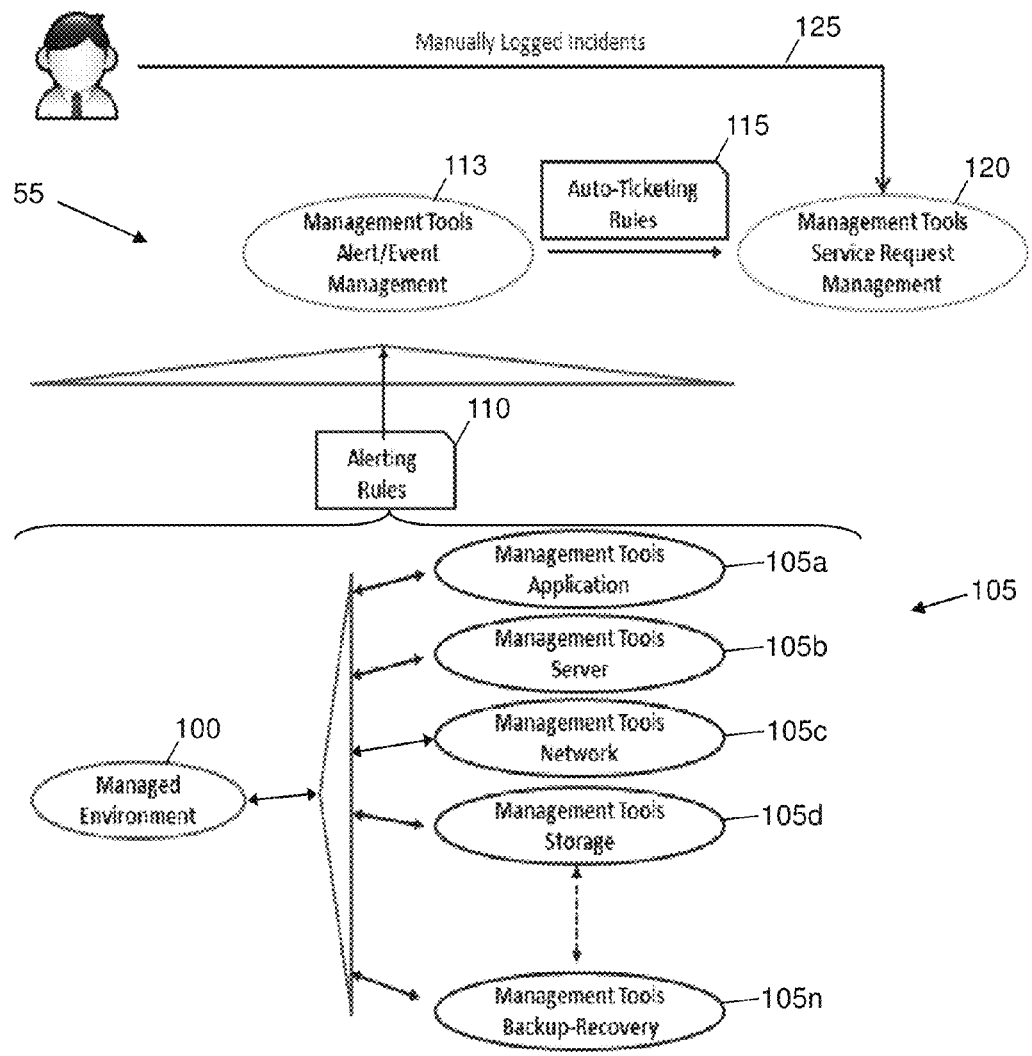
FIG. 2 shows a block diagram of an operational model for managing an IT environment in accordance with aspects of the invention.

FIG. 2 shows a block diagram of an operational model for managing an IT environment in accordance with aspects of the invention. In particular, FIG. 2 depicts an operational managed environment 100 and an associated event management and ticketing system (EMTS), such as EMTS 55 as described with respect to FIG. 1. EMTS 55 takes input from event alerts generated by different management sources 105, such as application 105a, server 105b, network 105c, storage 105d, and backup 105n, to name a few, following predefined alerting rules 110. Each of the management sources 105 may include specially programmed, computer-based management and monitoring systems that automatically detect predefined events and create alerts based on the detected events. As is understood in the art, events may be anything of interest that are defined in alerting rules 110 and detectable by management sources 105, including but not limited to: a network connection being inoperative; a backup system exceeding a predefined threshold of storage (e.g., exceeding 80% storage capacity); a network data transfer taking more than a predefined amount of time to occur; a network drive going offline; etc.

Still referring to FIG. 2, module 113 of EMTS 55 automatically creates tickets (e.g., auto-tickets) based on certain ones of the alerts according to predefined auto-ticketing rules 115 also referred to as global filtering rule(s). In this manner, EMTS 55 filters out less critical alerts via the auto-ticketing rules 115 and, thus, generates auto-tickets for only a subset of alerts generated by management sources 105. EMTS 55 provides the auto-tickets to a ticket management module 120 that is accessible by an administrator, e.g., system user. As is understood in the art, and as depicted at path 125, tickets may also be manually generated and added to ticket management module 120, e.g., by an administrator.

An exemplary ticket nomenclature system denotes management sources 105a-n as M1, M2, . . . , Mn. For example, application management source 105a may be denoted M1, server management source 105b may be denoted M2, and so on. The nomenclature system may represent an event "i" as $E_i(M_i, t_g)$, where $M_i$ represents the management source that detects event "i" and $t_g$ is the time an alert associated with event "i" is generated. Global filtering rule module 113 may label each event with a severity label, such as critical (C), warning (W), and informational (I). Global filtering rule module 113 may also automatically issue a ticket for an event Ei based on auto-ticketing rules 115. The ticket is denoted by $T_i^A(E_i(M_i, t_g), t_s, S)$, where the superscript "A" indicates that the ticket was generated automatically from event $E_i(M_i, t_g)$ at ticketing issuing time $t_s$. The ticket status indicator "S" may be set to unprocessed (U) by default. When a system administrator inspects the ticket and takes further action, the ticket status indicator "S" may be changed to active (A). When a system administrator inspects the ticket and takes no further action, the ticket status indicator "S" may be changed to inactive (I), which may be the case, for example, when the system administrator is aware of the root cause of the ticket and/or the ticket does not apply to the specific configuration of the account. A manually generated ticket may be denoted by $T_i^A(E_i(M_i, t_g), t_s, S)$, where $t_s$ is the time the ticket was manually sent to the system. This nomenclature system is exemplary and is not intended to limit the invention; rather, implementations of the invention may be practiced with other nomenclature systems.

As described thus far, it is possible for EMTS 55 of FIG. 2 to generate more than one ticket for a single event that occurs in environment 100. For example, a single network disconnection in environment 100 may trigger a first alert from application management source 105a and a second alert from network management source 105c, and these two alerts may result in the automatic creation of two tickets. The creation of more than one ticket for a single event results in redundant tickets at module 120, and this redundancy creates inefficient in the sense that it consumes the administrator's time. Aspects of the invention reduce such inefficiency by providing a framework for EMTS 55 to calibrate (e.g., change) alerting rules 110 and/or auto-ticketing rules 115 to reduce the number of redundant tickets.

Figure 3:
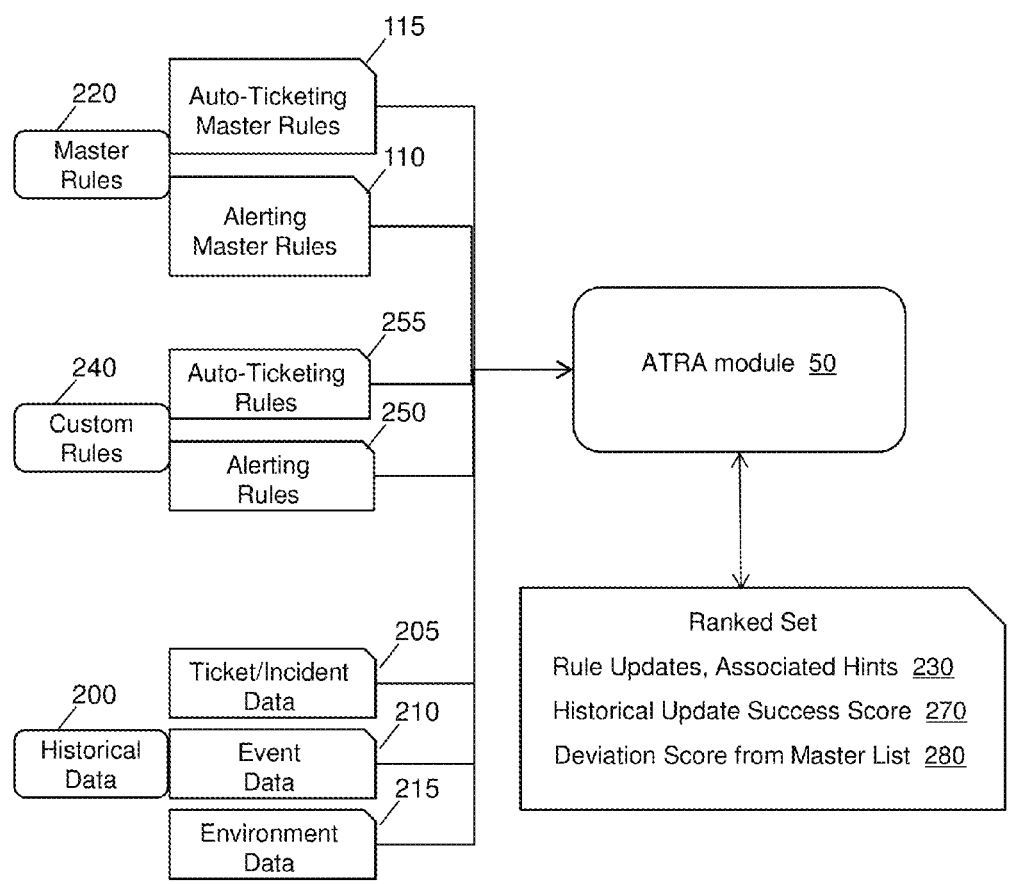
FIG. 3 shows a block diagram of calibration framework in accordance with aspects of the invention.

FIG. 3 shows a block diagram of calibration framework in accordance with aspects of the invention. In embodiments, ATRA module 50 receives historical data 200 (e.g., ticket incident data 205, event data 210, environment data 215, etc.) and master rules 220 (e.g., alerting rules 110, auto-ticketing rules 115, etc.) as input data, and generates suggested rule updates and/or hints 230 based on the input data. When a system administrator accepts a suggested rule update, ATRA module 50 modifies an existing rule in master rules 220 and/or creates a new rule in custom rules 240 (e.g., custom alerting rules 250, custom auto-ticketing rules 255, etc.) based on the accepted rule update. Historical data 200, master rules 220, and custom rules 240 are stored by or otherwise available to EMTS 55 and are provided to ATRA module 50 by EMTS 55.

In embodiments, master rules 220 represent a universal rule set that is applicable to all plural accounts, e.g., plural different managed environments. In aspects of the invention, custom rules 240 represent an auto-ticketing/alerting rule set that is applicable only to an individual account, e.g., a particular managed environment. In aspects of the invention, historical data 200 may include, but is not limited to, ticket/event data (e.g., manual tickets), and environment data (e.g., new nodes added with routing changes, etc.). The historical information (e.g., historical data 200) utilized by ATRA module 50 may be a full history of records or a subset of all records sampled by certain algorithms, in order to reduce the computational overhead.

A first example of a rule update that may be suggested by ATRA module 50 is adding a type of event to an auto-ticketing rule to reduce a number of manual tickets created in the system. In this first example, ATRA module 50 analyzes historical data 200 and identifies any event that results in the generation of more than a predefined number of manual tickets in a predefined time. The predefined number and predefined time may be set to any suitable values, such as, but not limited to, ten manual tickets in one week. As is understood in the art, each type of event may be associated with a unique event code, one example being ANR8311E. For each manual ticket in the system, an event code and a time the event occurred are stored in historical data 200, e.g., as described with respect to FIG. 2. In this first example of a rule update, ATRA module 50 is programmed to analyze historical data 200 to determine that a type of event (e.g., an ANR8311E event) triggered the creation of more than ten manual tickets in a one week time period, and to make a recommendation for creating a custom auto-ticketing rule for this type of event based on the determining. Logic for this first example is shown in Table 1 using the nomenclature system described with respect to FIG. 2.

TABLE 1 for each event $E_j$ in $\{E^M\}$
   for all manual tickets $T_i^M$ in $\{T^M\}$ TABLE 1-continued if ($T_i^M.E_i == E_j$ && $T_i^M.S == A$)
         counter ++;
      end
   end
   if counter > 10
      rule.hint('10 manual tickets were created for $E_j$ in last week.');
      rule.suggest('Add $E_j$ to the auto-ticketing rule?');
   end
end A second example of a rule update that may be suggested by ATRA module 50 is removing a type of event from an auto-ticketing rule to reduce a number of auto-tickets created in the system. In this second example, ATRA module 50 may be programmed to analyze historical data 200 to identify any event that results in the generation of more than a predefined ratio of inactive auto-tickets. As described with respect to FIG. 2, an auto-ticket may have a status that is either active or inactive. In this example, when the ratio of inactive tickets to total tickets (e.g., active plus inactive) for a particular event exceeds a predefined threshold, ATRA module 50 is programmed to suggest changing the auto-ticketing master rules to remove this auto-ticketing rule from the auto-ticketing master rules 115. The predefined threshold may be any suitable number, such as 80%. The predefined threshold may also be changed in the system, e.g., by the system administrator. Logic for this second example is shown in Table 2 using the nomenclature system described with respect to FIG. 2.

TABLE 2 for each event $E_i$ in $\{E^A\}$
   for all auto-tickets $T_i^A$ in $\{T^A\}$
      if ($T_i^A.E_i == E_j$)
         counter1 ++;
      end
      if ($T_i^A.E_i == E_j$ && $T_i^A.S == I$)
         counter2 ++;
      end
   end
   if counter2/counter1 > 80%
      rule.hint('80% of the auto-tickets for $E_j$ are inactive during last week ');
      rule.suggest('Remove $E_j$ from the auto -ticketing rule?');
   end
end A third example of a rule update that may be suggested by ATRA module 50 is disallowing the creation of an auto-ticket for a particular event based on an auto ticket having been created for another event within a predefined time period. In this third example, ATRA module 50 analyzes historical data 200 and identifies an event that results in an inactive auto-ticket being generated within a predefined time of an active ticket of another event. For example, ATRA module 50 may be programmed to determine from historical data 200 that an auto-ticket triggered by event E3 is always inactive when it is issued within a predefined time (e.g., 15 minutes, or some other suitable value) relative to another auto-ticket triggered by event E4. In this example, ATRA module 50 is programmed to suggest changing the auto-ticketing master rules 115 to prevent (e.g., disallow) creating an auto-ticket for event E3 within 15 minutes of an auto-ticket having been created for event E4. Logic for this third example is shown in Table 3 using the nomenclature system described with respect to FIG. 2.

TABLE 3

```
// given E_i is suggested to be removed from the auto-ticketing rule
    for all other event E_k in {E^A}
        for all auto-tickets T_i^A in {T^A}
            if (T_i^A.E_i == E_j && T_i^A.S == I)
                counter1 ++;
                for other auto -tickets T_i^A in {T^A}
                    if (T_i^A.E_i == E_k && (T_i^A.t_s − T_i^A.t_r) < 15 min && T_i^A.S == A)
                        counter2 ++;
                    end
                end
            end
        end
        if (counter2/counter1 > 90%)
            rule.hint('90% of the inactive tickets from E_i are associated
with
            an active ticket
            from E_k issued within 15 minutes. ')
            rule.suggest('Disable auto-ticketing for E_j if a ticket for E_k
            was issued within 15
            minutes ?');
        end
```

The third example described above may also include a tunable threshold for determining when to disallow auto-ticketing for one event based on a time relative to another event. For example, ATRA module 50 may be programmed to determine from historical data 200 that an auto-ticket triggered by event E3 is inactive more than 90% of the time when it is issued within a predefined time relative to another auto-ticket triggered by event E4, and suggest changing the auto-ticketing master rules to prevent (e.g., disallow) creating an auto-ticket for event E3 within the predefined time of an auto-ticket having been created for event E4. In this implementation, the tunable threshold (e.g., more than 90% of the time) may be adjusted, e.g., by the system administrator.

The first, second, and third examples described above are not limiting, and ATRA module 50 may be programmed with appropriate logic to perform any desired analysis of historical data 200 and to make any desired suggestion for a rule update based on the analysis. In this manner, ATRA module 50 may be tailored to provide account specific recommendations for a particular managed IT environment.

Still referring to FIG. 3, and in accordance with aspects of the invention, ATRA module 50 may be configured to analyze the input data and generate suggested rule updates and/or hints on a periodic basis, e.g., once a week or any other suitable time period. In embodiments, during each periodic iteration, ATRA module 50 accesses the data defining all of the manual tickets and auto-tickets that were generated during the current time period (e.g., the past week), and also accesses the data defining the event associated with each ticket. In aspects of the invention, ATRA module 50 then applies programmed algorithms to the data, or any desired subset of the data, and generates suggested rule changes and/or hints based on outcomes of the algorithms, e.g., as described above in the first, second, and third examples. The system administrator may accept or reject any suggested rule change. In embodiments, when the system administrator accepts a suggested rule change, ATRA module 50 modifies master rules 220 and/or custom rules 240 to incorporate the accepted rule change. The modified master rules 220 and/or custom rules 240 are subsequently applied to future events and alerts that occur in the next iteration time period, e.g., the next week. In this manner, the master rules 220 and custom rules 240 may adaptively change over time, and the changes to these rule sets are applied to future events and alerts.

With continued reference to FIG. 3, at each periodic iteration (e.g., once a week, or the like), ATRA module 50 may generate and report performance metrics such as, for example, an update success score 270 and/or a deviation score 280. In accordance with aspects of the invention, update success score 270 includes a comparison of: (1) a number of tickets created with a current iteration of custom rules 240 and modified master rules 220 to (2) a number of tickets that would have been created with the original master rules 220 without any modification and without any custom rules. For example, ATRA module 50 may be programmed to run a simulation using the historical data 200, including all of the events associated with the current time period, against the original master rules 220, which may be stored in data storage. This simulation provides a number of tickets that would have been created by EMTS 55 using the original master rules 220 as if these master rules 220 had never been modified according to suggestions made using ATRA module 50. The number of tickets generated in the simulation can be compared to the number of tickets that were actually generated during the time period using the modified master rules 220 and any custom rules 240. This comparison provides the system administrator with a metric for evaluating the performance of ATRA module 50.

In accordance with aspects of the invention, deviation score 280 is an indication of a number of modifications that have been made relative to the original master rules 220 (e.g., a global rule set) and/or relative to the previous iteration. In embodiments, ATRA module 50 is configured to track the number of suggested rules changes that are accepted and implemented by the system administrator, and also when each suggested rule change was accepted and implemented. In this manner, ATRA module 50 may be configured to provide the administrator with the number of rules changes that are accepted and implemented each time period, e.g., 3 rules changes in week one, 4 rules changes in week two, 0 rules changes in week three, etc. In this manner, ATRA module 50 may also provide the administrator with the total number of rules changes relative to the original master rules 200, e.g., 3+4+0=7 total rules changes over three time periods. In embodiments, ATRA module 50 may also determine a deviation score for a first user account by comparing the custom rules of the first user account to the rules of a second user account, e.g., the first and second users being similarly situated with similar infrastructure setups. In this embodiment, the deviation score corresponds to the number of rules differences between the accounts of the first and second users. In this manner, implementations of the invention may determine and present a deviation score with respect to at least one of: a global rule set, and another user account.

Figure 4:
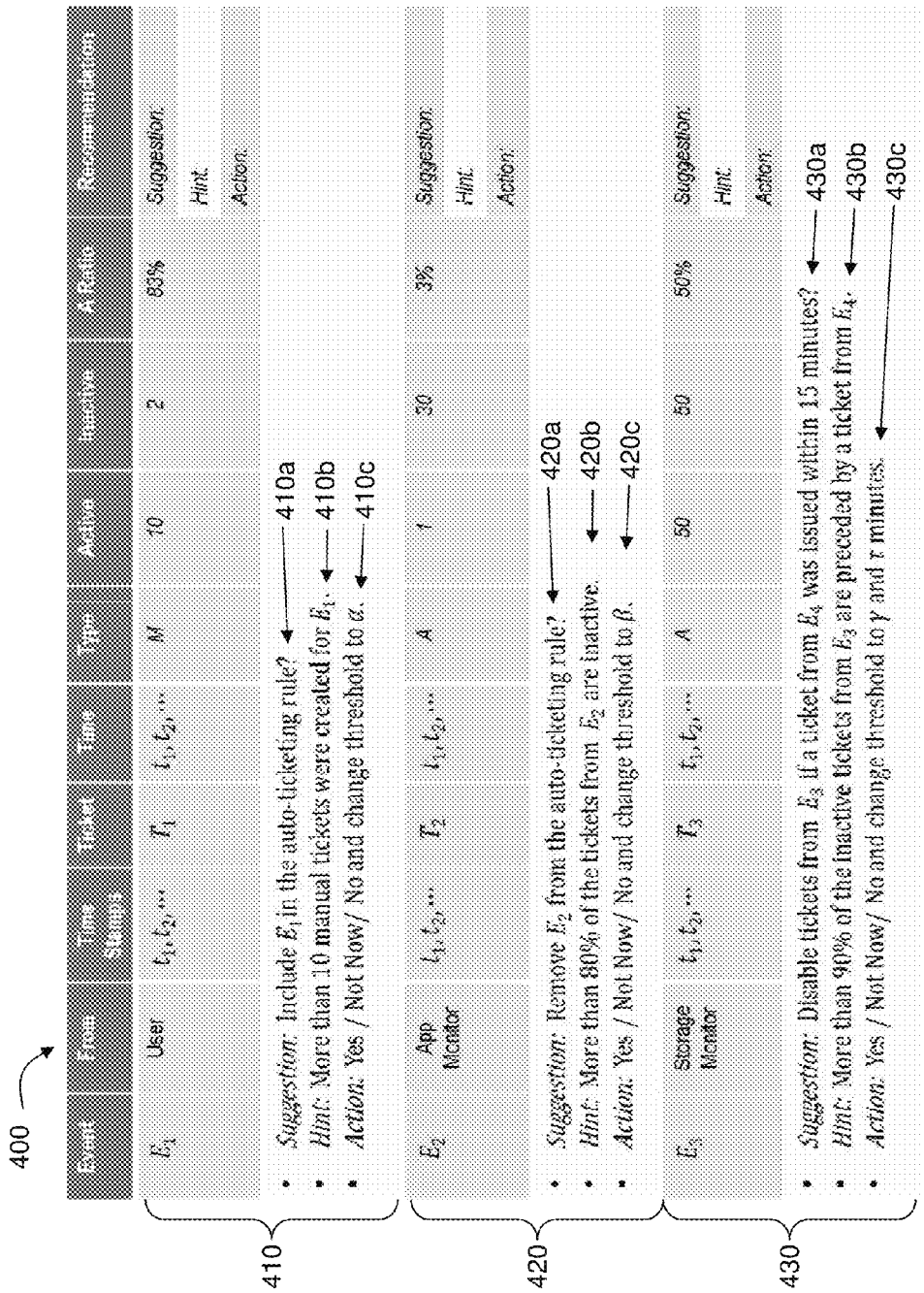
FIG. 4 shows an exemplary output in accordance with aspects of the invention.

FIG. 4 shows an exemplary output 400 of ATRA module 50 in accordance with aspects of the invention. Output 400 may be presented to a system administrator or other user as a graphical user interface via I/O device 28 described with respect to FIG. 1. Output 400 is illustratively depicted with reference to the first example, second example, and third example described with respect to FIG. 3; however, the invention is not limited to these examples or to any specific type of output, and any suitable output may be used within the scope of the invention. In embodiments, output 400 is generated by ATRA module 50 using suitable computer programming.

As shown in FIG. 4, output 400 includes a first area 410 corresponding to the first example, a second area 420 corresponding to the second example, and a third area 430 corresponding to the third example. In embodiments, the first area 410, second area 420, and third area 430 constitute a ranked list of suggested rule changes that are generated and presented by ATRA module 50 via an interface.

More specifically, in this example, first area 410 is generated by ATRA module 50 based on ATRA module 50 analyzing the system data and determining that more than ten tickets were manually generated for a single type of event over the time period of interest, e.g., as described above in the first example of FIG. 3. In embodiments, first area 410 of output 400 includes a display of, among other things, an identifier of the "Event" (e.g., E1), a "Type" of ticket associated with this event (e.g., "M" for manual), a number of "Active" tickets for this event (e.g., "10"), a number of "Inactive" tickets associated with this event (e.g., "2"), and a "Ratio" of active to inactive tickets for this event (e.g., 83%).

In accordance with aspects of the invention, first area 410 of output 400 also includes a display of a suggested rule change 410a, a hint 410b, and an action area 410c. In embodiments, action area 410c includes user-selectable fields, such as "Yes", "Not Now", and "No and Change". In aspects of the invention, when a user selects "Yes" at action area 410c, ATRA module 50 modifies the master rules and or custom rules to adopt the suggested rule change 410a. On the other hand, when a user selects "Not Now" at action area 410c, ATRA module 50 does not modify the master rules and or custom rules to adopt the suggested rule change 410a. Further, when a user selects "No and Change" at action area 410c, ATRA module 50 permits the user to modify a parameter associated with the algorithm that analyzes the data for suggesting rule changes. In this example, the adjustable parameter is a threshold "a" corresponding to a number of manual tickets that trigger the suggested rule change (e.g., 10 in this example). Accordingly, in aspects of the invention, the user may select "No and Change" and then change the threshold from 10 to 12, and during the next periodic iteration ATRA module 50 will use a threshold of 12 instead of 10 when analyzing the data with respect to this algorithm. In this manner, a particular system administrator may adjust the parameters of the analysis for their particular managed environment.

Still referring to FIG. 4, exemplary output 400 includes second area 420 generated by ATRA module 50 based on ATRA module 50 analyzing the system data and determining that more than a predetermined ratio of auto-tickets for an event are inactive, e.g., as described above in the second example of FIG. 3. In embodiments, second area 420 of output 400 includes a display of, among other things, an identifier of the "Event" (e.g., E2), a "Type" of ticket associated with this event (e.g., "A" for auto), a number of "Active" tickets for this event (e.g., "1"), a number of "Inactive" tickets associated with this event (e.g., "30"), and a "Ratio" of active to inactive tickets for this event (e.g., 3%). Second area 420 may include a display of a suggested rule change 420a, a hint 420b, and an action area 420c. Action area 420c may function in a manner similar to action area 410c, except that the changeable parameter(s) may be different for second area 420. In this example, the changeable parameter "β" in action area 420c corresponds to the ratio of active to inactive auto-tickets for event E2, and may be changed by a user to tune their managed environment in a desired manner.

With continued reference to FIG. 4, exemplary output 400 includes third area 430 generated by ATRA module 50 based on ATRA module 50 analyzing the system data and determining that more 90% of auto-tickets generated from event E3 within 15 minutes of a ticket generated from event E4 are inactive, e.g., as described above in the third example of FIG. 3. In embodiments, third area 430 of output 400 includes a display of, among other things, an identifier of the "Event" (e.g., E3), a "Type" of ticket associated with this event (e.g., "A" for auto), a number of "Active" tickets for this event (e.g., "50"), a number of "Inactive" tickets associated with this event (e.g., "50"), and a "Ratio" of active to inactive tickets for this event (e.g., 50%). Third area 430 may include a display of a suggested rule change 430a, a hint 430b, and an action area 430c. Action area 430c may function in a manner similar to action area 410c, except that the changeable parameter(s) may be different for third area 430. In this example, the changeable parameters in action area 430c are "γ" which corresponds to the threshold (e.g., 90%) and "τ" which corresponds to the time (e.g., 15 minutes), and these may be changed by a user to tune their managed environment in a desired manner.

Flow Diagram

Figure 5:
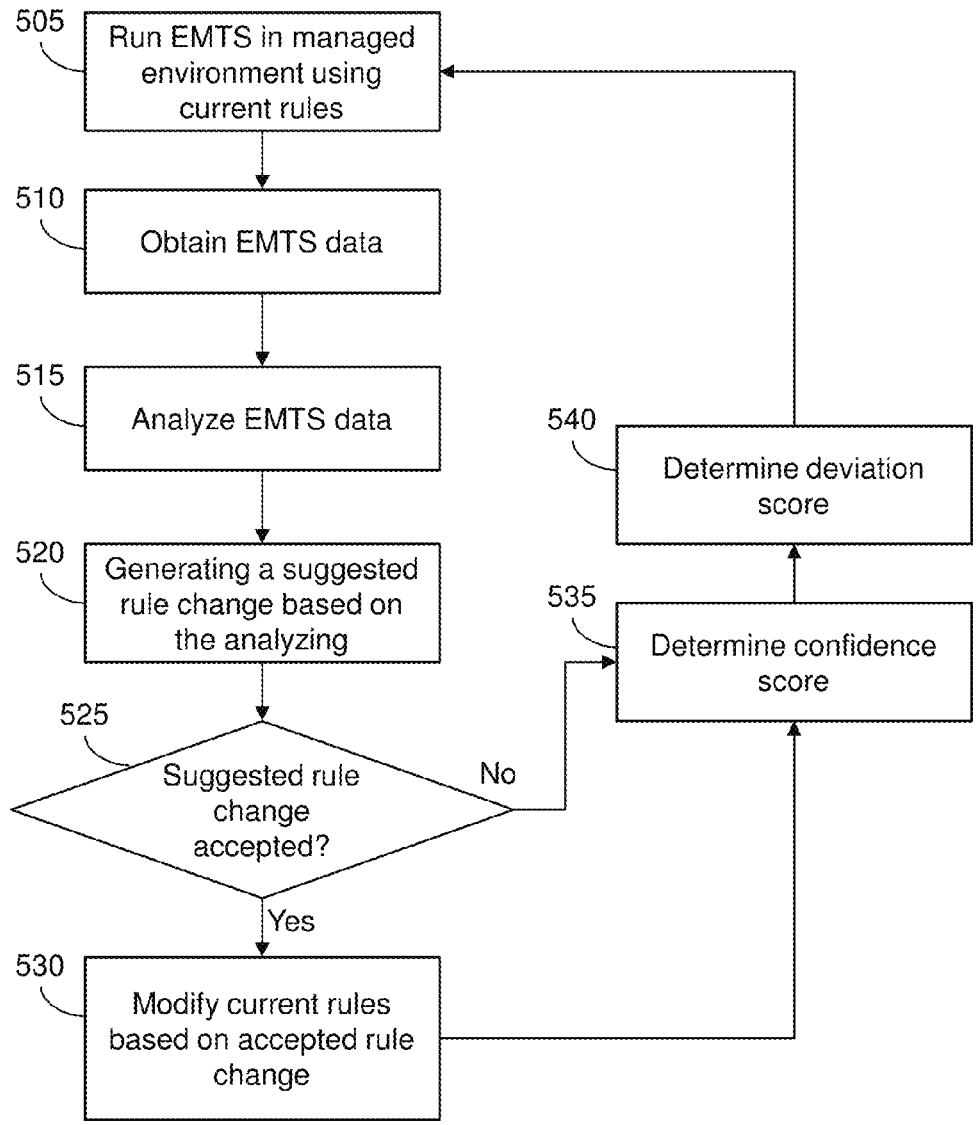
FIG. 5 shows an exemplary flow diagram of a process in accordance with aspects of the invention.

FIG. 5 shows an exemplary flow for performing aspects of the present invention. The steps of FIG. 5 may be implemented in the environment of FIG. 1, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 5 depicts an exemplary flow for a process in accordance with aspects of the present invention. At step 505, an EMTS (e.g., EMTS 55) is run in a managed environment (e.g., environment 100) using a current set of rules (e.g., master rules 220). The EMTS handles alerts and events, and creates tickets based on certain ones of the alerts and events, according to the current set of rules. Data associated with the alerts, events, and tickets from step 505 is stored, e.g., in storage system 22B. At step 510, an ATRA module (e.g., ATRA module 50) running on a computer device obtains the EMTS data for step 505. In embodiments, the data obtained at step 510 corresponds to historical data 200 described with respect to FIG. 3. At step 515, the ATRA module analyzes the data obtained at step 515, e.g., by applying predefined decision criteria to the data as described with respect to FIGS. 3 and 4. At step 520, the ATRA module determines a suggested rule change based on the determining of step 515, e.g., in a manner similar to that described with respect to FIGS. 3 and 4. Step 520 may also include displaying the suggested rule change, a hint, and possible actions, e.g., via output 400 as described with respect to FIG. 4.

At step 525, the ATRA module determines whether the suggest rule change from step 520 is accepted by a user. Step 520 may include receiving an input from a user via a graphic user interface of output 400, e.g., as described with respect to FIG. 4. In the event, the suggested rule change is accepted, then at step 530 the ATRA module modifies the current rules (e.g., modifies the master rules 220 and/or custom rules 240) to incorporate the accepted rule change, and the process proceeds to the next step. On the other hand, when the suggested rule change is not accepted at step 525, then the ATRA module does not modify the current rules. Also, when the suggested rule change is not accepted at step 525, the ATRA module may receive input via an interface (e.g., output 400) to change one or more parameters associated with suggested rule change, e.g., as described with respect to FIG. 4.

At step 535, the ATRA module determines a confidence score, e.g., a success score 270 as described with respect to FIG. 3. At step 540, the ATRA module determines a deviation score, e.g., a deviation score 280 as described with respect to FIG. 3. These scores may be displayed to the user. The process then returns to step 505 and begins a next iteration using the rules including any modification made at step 530.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, by a computer device, data associated with a first set of auto-tickets automatically generated by an event management and ticketing system in a managed information technology environment, wherein the first set of auto-tickets are generated according to auto-ticketing rules;
   analyzing, by the computer device, the data associated with the first set of auto-tickets;
   determining, by the computer device, a ranked list of suggested rule changes based on the analyzing the data;
   receiving, by the computer device, a selection of at least one of the suggested rule changes; and
   generating, by the computer device, new auto-ticketing rules by modifying the auto-ticketing rules to incorporate the at least one of the suggested rule changes, wherein the new auto-ticketing rules reduce a number of redundant tickets generated by the managed information technology environment.

2. The method of claim 1, wherein the acceptance is received, the method further comprising:
   sending, by the computer device, the new auto-ticketing rules to the event management and ticketing system.

3. The method of claim 2, further comprising:
   obtaining, by the computer device, a second set of auto-tickets generated by the event management and ticketing system during a time period using the new auto-ticketing rules;
   performing, by the computing device, a simulation using the data associated with the first set of auto-tickets to determine a number of tickets that would have been created by the event management and ticketing system during the time period using the auto-ticketing rules; and
   comparing, by the computer device, the number of tickets generated by the event management and ticketing system with the number of tickets that would have been created by the event management and ticketing system.

4. The method of claim 1, further comprising:
   obtaining new data by operating the event management and ticketing system in the managed environment using the new auto-ticketing rules for a predefined period of time; and
   repeating the analyzing and the generating using the new data.

5. The method of claim 2, wherein the data comprises at least one of:
   ticket data;
   event data; and
   environment data.

6. The method of claim 2, wherein the data is historical data over a predefined time period.

7. The method of claim 1, wherein the suggested rule change comprises a suggestion to add an event to one of the auto-ticketing rules.

8. The method of claim 7, wherein the ranked list of suggested rule changes are generated based on the analyzing determining that more than a predefined number of manual tickets associated with the event are generated over a predefined time period.

9. The method of claim 1, wherein the ranked list of suggested rule changes comprises a suggestion to remove an event from an auto-ticketing rule.

10. The method of claim 9, wherein the ranked list of suggested rule changes are generated based on the analyzing determining that more than a predefined number of auto-tickets associated with the event are inactive.

11. The method of claim 1, wherein the ranked list of suggested rule changes comprises a suggestion to disable auto-ticketing for a first event based on an existence of a ticket from a second event within a predefined time.

12. The method of claim 11, wherein the ranked list of suggested rule changes are generated based on the analyzing determining that more than a predefined number of auto-tickets associated with the first event are inactive when created within the predefined time relative to when a ticket associated with the second event is created.

13. The method of claim 1, further comprising presenting the ranked list of suggested rule changes, a hint, and at least one selectable action to a user.

14. The method of claim 13, further comprising, based on the presenting, receiving an input from a user to change a parameter used in the analyzing.

15. The method of claim 1, wherein a service provider at least one of creates, maintains, deploys and supports the computer device.

16. The method of claim 1, wherein steps of claim 1 are provided by a service provider on a subscription, advertising, and/or fee basis.

17. The method of claim 1, further comprising deploying a system for managing events comprising providing the computer device operable to perform the steps of claim 1.

18. A computer program product for managing events, the computer program product comprising a non-transitory computer usable storage medium having program code embodied in the storage medium, the program code readable/executable by a computing device to:
- obtain data associated with a first set of auto-tickets automatically generated by an event management and ticketing system in a managed information technology environment, wherein the first set of auto-tickets are generated according to a rule set over a first time period;
- determine and present a ranked list of suggested rule changes based on analyzing the data;
- create a new rule set by modifying the rule set to incorporate at least one of the suggested rule changes, wherein the new rule set reduces a number of redundant tickets generated by the event management and ticketing system;
- obtain new data associated with a second set of auto-tickets generated by the event management and ticketing system in the managed information technology environment, wherein the second set of auto-tickets are generated according to the new rule set over a second time period;
- determine and present a new ranked list of suggested rule changes based on analyzing the new data;
- determine and present a success score, wherein the success score indicates whether ticket redundancies were reduced between the first set of auto-ticket and the second set of auto-tickets; and
- determine and present a deviation score with respect to at least one of: a global rule set, and another user account.

19. A system, comprising:
- an event management and ticketing system configured to automatically generate auto-tickets for an administrator of an information technology environment;
- program instructions to generate, by the event management and ticketing system, a first batch of auto-generated tickets including an amount of redundant information based on a plurality of auto-ticketing rules;
- a CPU, a computer readable memory and a computer readable storage medium;
- program instructions stored on the computer readable storage medium to obtain data associated with the first batch of auto-tickets generated by the event management and ticketing system, wherein a first set of tickets of the first batch of auto-tickets are generated according to a rule set of the plurality of auto-ticketing rules;
- program instructions stored on the computer readable storage medium to determine and present a ranked list of suggested rule changes based on analyzing the data, wherein the ranked list of suggested rule changes includes at least one of: adding an event to one of the plurality of auto-ticketing rules, removing an event from one of the plurality of auto-ticketing rules, and disabling auto-ticketing for a first event based on an existence of a ticket for a second event;
- program instructions stored on the computer readable storage medium to create a new rule set by modifying the rule set to incorporate at least one of the suggested rule changes based on receiving acceptance of the at least one of the suggested rule changes from a user; and
- program instructions to generate, by the event management and ticketing system, new auto-tickets based on the new rule,
- wherein the new auto-tickets include an amount of redundant information that is less than the amount of redundant information in the auto-tickets; and
- wherein the program instructions are stored on the computer readable storage medium for execution by the CPU via the computer readable memory.

* * * * *